United States Patent
Mesa

(10) Patent No.: US 8,035,243 B1
(45) Date of Patent: Oct. 11, 2011

(54) SYSTEM TO OBTAIN ENERGY FROM WATER WAVES

(75) Inventor: Manuel Constanzo Mesa, Miami, FL (US)

(73) Assignee: Matter Wave Technologies, LLC., Miami, FL (US)

( * ) Notice: Subject to any disclaimer, the term of this patent is extended or adjusted under 35 U.S.C. 154(b) by 407 days.

(21) Appl. No.: 12/409,608

(22) Filed: Mar. 24, 2009

(51) Int. Cl.
*F03B 13/10* (2006.01)
*F03B 13/12* (2006.01)

(52) U.S. Cl. ............... 290/53; 290/42; 60/495; 60/497; 60/502; 60/503

(58) Field of Classification Search ............ 60/495–497, 60/500–506; 290/42–43, 48, 53–54; 417/331–333
See application file for complete search history.

(56) References Cited

U.S. PATENT DOCUMENTS

| | | | |
|---|---|---|---|
| 597,833 A | 1/1898 | Palmeron | |
| 675,039 A | 5/1901 | Graff | |
| 1,223,184 A | 4/1917 | Larson | |
| 3,668,412 A * | 6/1972 | Vrana et al. | 290/53 |
| 3,970,415 A | 7/1976 | Widecrantz et al. | |
| 4,013,382 A * | 3/1977 | Diggs | 417/332 |
| 4,078,871 A | 3/1978 | Perkins, Jr. | |
| 4,083,186 A * | 4/1978 | Jackson, Sr. | 60/325 |
| 4,203,294 A | 5/1980 | Budal et al. | |
| 4,232,230 A | 11/1980 | Ames | |
| 4,242,593 A | 12/1980 | Quilico et al. | |
| 4,363,213 A | 12/1982 | Paleologos | |
| 4,580,400 A * | 4/1986 | Watabe et al. | 60/398 |
| 4,672,222 A | 6/1987 | Ames | |
| 5,359,229 A * | 10/1994 | Youngblood | 290/53 |
| 5,461,862 A | 10/1995 | Ovadia | |
| 5,710,464 A | 1/1998 | Kao et al. | |
| 5,921,082 A | 7/1999 | Berling | |
| 6,020,653 A | 2/2000 | Woodbridge et al. | |
| 6,045,339 A | 4/2000 | Berg | |
| 6,328,539 B1 | 12/2001 | Hung | |
| 6,644,027 B1 | 11/2003 | Kelly | |
| 6,747,363 B2 | 6/2004 | Sanchez Gomez | |
| 6,857,266 B2 | 2/2005 | Dick | |
| 6,925,800 B2 | 8/2005 | Hansen et al. | |
| 7,305,823 B2 | 12/2007 | Stewart et al. | |
| 7,331,174 B2 | 2/2008 | Welch, Jr. | |
| 7,411,311 B2 * | 8/2008 | Tal-or | 290/53 |
| 7,538,445 B2 * | 5/2009 | Kornbluh et al. | 290/53 |
| 2002/0157398 A1 * | 10/2002 | Boyd | 60/721 |

FOREIGN PATENT DOCUMENTS

| | | |
|---|---|---|
| EP | 1682776 A1 | 7/2007 |
| WO | 2006/100436 A1 | 9/2006 |

* cited by examiner

*Primary Examiner* — Tran Nguyen
(74) *Attorney, Agent, or Firm* — Albert Bordas, P.A.

(57) ABSTRACT

A system to harness energy from water waves, comprising a frame assembly, first and second hydraulic systems, at least one float assembly, and an electrical assembly. The float assembly comprises front, rear, bottom, top, and first and second lateral faces. The float assembly further comprises a trailing face. The trailing face and the rear face merge to define an edge. The float assembly is mounted onto the mounting plate. The float assembly is placed in a body of water that comprises wave forces. The electrical system comprises a generator. The generator produces electricity when driven by the hydraulic motor when hydraulic fluid is displaced and pressurized within a hydraulic system when the wave forces cause the float assembly to move when in the body of water.

20 Claims, 13 Drawing Sheets

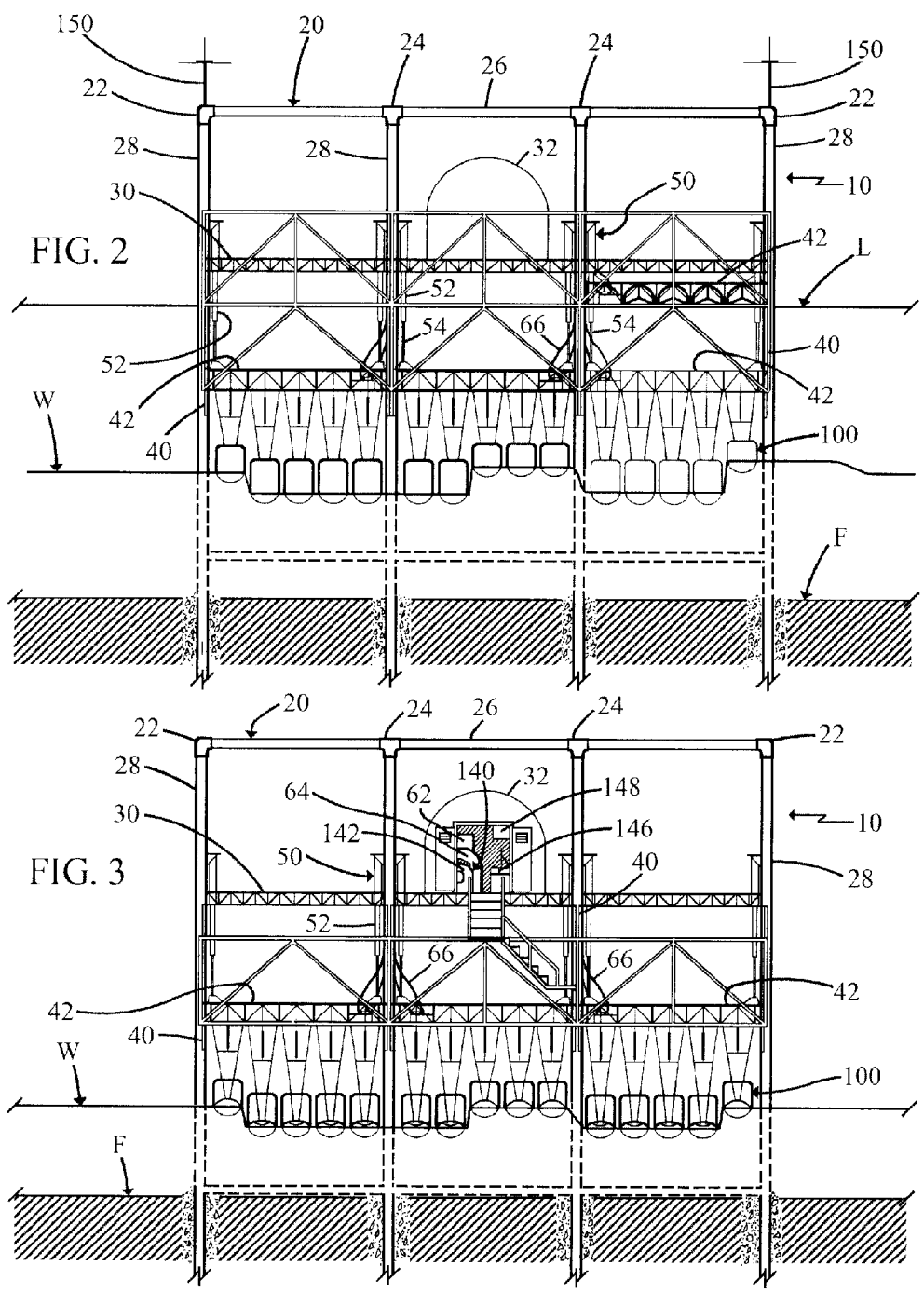

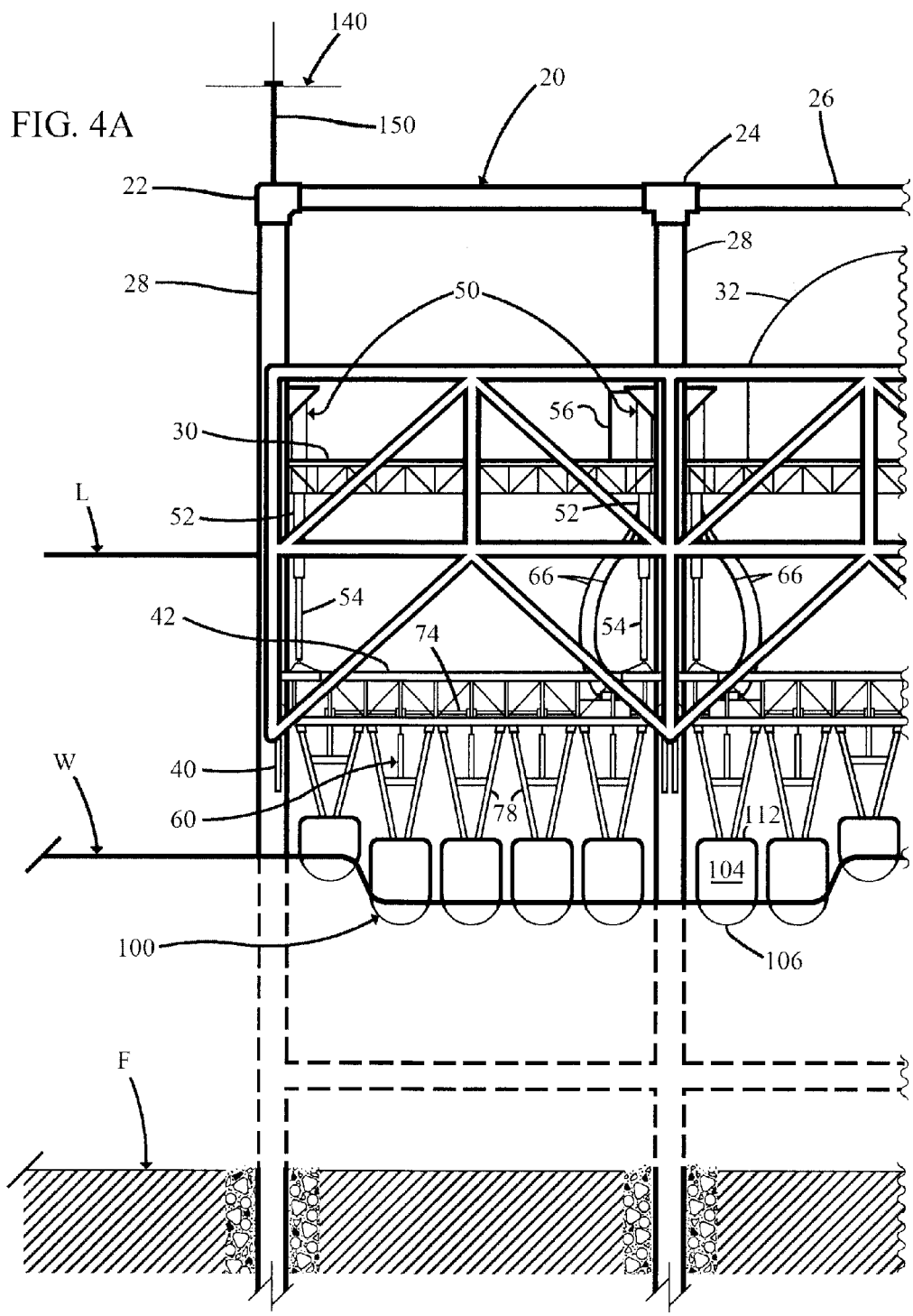

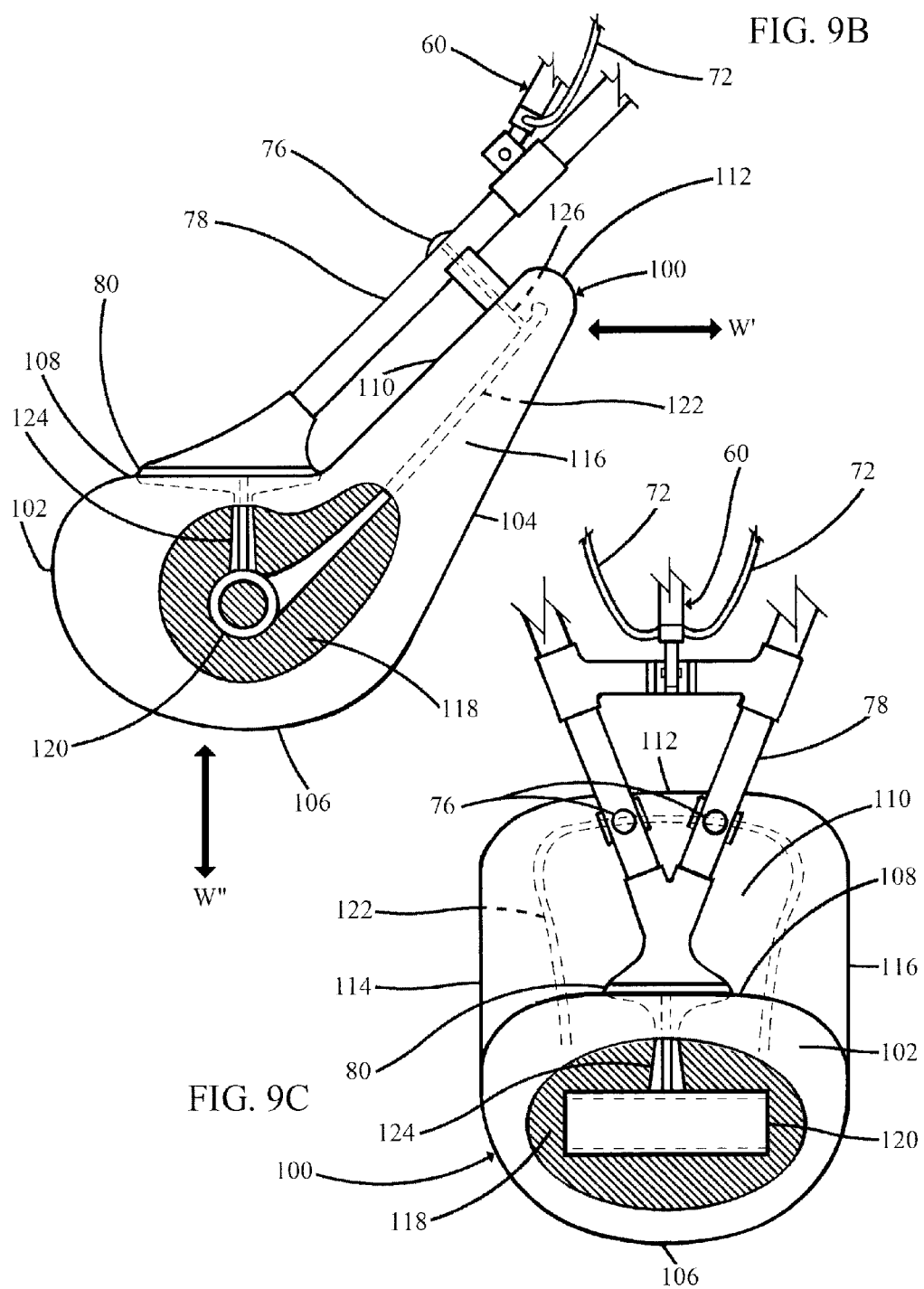

SYSTEM TO OBTAIN ENERGY FROM WATER WAVES

II. BACKGROUND OF THE INVENTION

1. Field of the Invention

The present invention relates to energy systems, and more particularly, to an energy system for harnessing energy from water waves.

2. Description of the Related Art

Mechanical waves are waves that propagate through a material medium (solid, liquid, or gas) at a wave speed, which depend on the elastic and inertial properties of that medium. There are two basic types of wave motion for mechanical waves: longitudinal waves and transverse waves. Water waves are an example of waves that involve a combination of both longitudinal and transverse motions. As a wave travels through the water, particles travel in clockwise circles. The radius of the circles decreases as the depth into the water increases.

Ocean waves are produced by an amount of energy transferred from wind speed over a sea surface, and are commonly mentioned as wave phenomena. Physicists and mathematicians prove a variety of intrinsic properties of waves. Such scientists divided and named a body of water waves to search, understand, and create exact models of them. Those parts include: the crest, which is the highest point of the wave; the trough, which is the lowest point of the wave; the height, which is the vertical distance between a crest and trough and where the energy is; the wave length, which is the horizontal distance between a crests or troughs of two consecutive waves; wave period, which is the time it takes for two consecutive crests or troughs to pass a fixed point; and the frequency, which is the number of waves that passed at a fixed point per unit of time.

Several machines to harness water wave energy have been considered in the past. Applicant believes that one of the closest references corresponds to U.S. Pat. No. 6,925,800 issued to Hansen, et al. on Aug. 9, 2005 for Wave Power Machine. However, it differs from the present invention because Hansen, et al. teach a wave force machine that is capable of utilizing an upward force from waves with a force from a float and rocker arm via rocker arm pipe, wherein one or more lock bearings are provided, which transfer the upward force causing the driving force shaft to rotate in the same direction. On each driving force shaft may be one after the other of mounted float, rocker arm and rocker arm pipe with lock bearings after the other, and several driving force shafts may be interconnected both horizontally and vertically to a toothed wheel with four driving force shafts. The total force from the driving force shafts may be brought to a gearbox and electric generator, and may be used in electricity production. Three wave force machines may be interconnected to form a star, so that the force from the three wave force machines may be gathered in a star point, wherein a gearbox and electric generator are positioned. Alternatively, several star points are interconnected to from a hexagon. In addition, Hansen, et al. teaches use of an upward force only, whereas the present invention considers additional forces, not only upward. Specifically, the present invention teaches horizontal wave forces and vertical wave forces that cause each float assembly to move when in a body of water.

Applicant believes that another reference corresponds to U.S. Pat. No. 597,833 issued to John M. Palmeron on Jan. 25, 1898 for Wave Power. However, it differs from the present invention because Palmer teaches a movable float that is employed to actuate a piston, which forces fluid through a suitable mechanism to a conduit or receiver. A hollow buffer piston rod carries pistons on its ends that are adapted to operate, respectively, in a pressure-cylinder and the buffer-cylinder. Fluid is forced by the pressure-piston through the hollow buffer-piston rod into the buffer-cylinder and from thence to the conduit or receiver.

Applicant believes that another reference corresponds to U.S. Pat. No. 675,039 issued to Justin J. Graff on May 28, 1901 for Wave-Motor. However, it differs from the present invention because Graff teaches wave-motors, and more particularly to a type in which an oncoming motion of wave or surf furnishes a motive power as distinguished from those in which a float is lifted vertically. Graff employs a float, not to secure a lifting action, but to form a buoyant part of an oscillating device, which buoyant part is the resistance to the wave and is self-adjusting to the height of the latter by reason of its buoyancy.

Applicant believes that another reference corresponds to U.S. Pat. No. 7,331,174 issued to Welch, Jr. on Feb. 19, 2008 for Buoyancy Pump Power System. However, it differs from the present invention because Welch, Jr. teaches a system for generating electricity that includes a pump operable to convert wave motion from a body of water into mechanical energy. The pump includes an input port through which an operating fluid can enter the pump and an output port through which the operating fluid can exit the pump. A first outlet line and a second outlet line are fluidly coupled to the output port of the pump. A first reservoir is fluidly connected to the first outlet line, and a second reservoir is fluidly connected to the second outlet line, both reservoirs being selectively capable of receiving operating fluid driven through the output port.

Applicant believes that another reference corresponds to U.S. Pat. No. 7,305,823 issued to Stewart, et al. on Dec. 11, 2007 for Active Impedance Matching Systems and Methods for Wave Energy Converter. However, it differs from the present invention because Stewart, et al. teaches an active impedance matching systems (AIMS) and methods for increasing the efficiency of a wave energy converter (WEC) having a shaft and a shell intended to be placed in a body of water and to move relative to each other in response to forces applied to the WEC by the body of water. The system includes apparatus for: (a) extracting energy from the WEC and producing output electric energy as a function of the movement of the shell (shaft) relative to the shaft (shell); and (b) for selectively imparting energy to one of the shell and shaft for causing an increase in the displacement and velocity (or acceleration) of one of the shell and shaft relative to the other, whereby the net amount of output electrical energy produced is increased. The apparatus may be implemented using a single device capable of being operated bi-directionally, in terms of both direction and force, or may be implemented by different devices.

Applicant believes that another reference corresponds to U.S. Pat. No. 6,857,266 issued to Dick on Feb. 22, 2005 for Wave Energy Converter. However, it differs from the present invention because Dick teaches a wave energy conversion apparatus. It comprises at least two devices, each comprising a surface float; at least one of the surface floats being rigidly attached to a submerged body. The movement of the two devices in response to a passing wave may be used to effect an energy transfer.

Applicant believes that another reference corresponds to U.S. Pat. No. 6,747,363 issued to Sanchez Gomez on Jun. 8, 2004 for Floating Platform Harvesting Sea Wave Energy for Electric Power Generation. However, it differs from the present invention because Sanchez Gomez teaches a floating platform harvesting sea wave energy comprising a helix or a turbine arranged at the bottom of a containment tube on a horizontal plane and devices to maintain the platform on the valley of the waves when the tide raises the sea level.

Applicant believes that another reference corresponds to U.S. Pat. No. 6,644,027 issued to Kelly on Nov. 11, 2003 for Apparatus for Protecting a Wave Energy Converter. However, it differs from the present invention because Kelly teaches an apparatus for converting the motion of sea waves to electrical energy. It comprises at least one vertically oriented linear generator, relatively reciprocating motion of the armature and stator of which is driven by a float immersed in the sea directly below the motor armature. To protect the generator against unfavorable sea conditions, on the onset or occurrence of same, the float is moved to and held in a position in which it is clear of, or submerged, in the sea. This movement may be achieved in whole or in part by operating the linear generator as a linear motor.

Applicant believes that another reference corresponds to U.S. Pat. No. 6,328,539 issued to Hung on Dec. 11, 2001 for Hydraulic Device Powered by Wave. However, it differs from the present invention because Hung teaches a hydraulic device powered by a wave having one or more posts secured on a sea floor, a float buoyant on the wave, a housing secured to the posts and having a slidable piston for separating the interior of the housing into two chambers. Four pipes are coupled to the chambers of the housing with four check valves, for allowing the fluid to be drawn into the chambers from two of the pipes and to be forced out of the chambers into the other pipes step by step in order to generate a hydraulic power or energy and for powering or actuating the other facilities.

Applicant believes that another reference corresponds to U.S. Pat. No. 6,045,339 issued to Berg on Apr. 4, 2000 for Wave Motor. However, it differs from the present invention because Berg teaches a wave energy harvesting apparatus of the type employing laterally spaced-apart floats arranged so that up and down movements of the floats in response to the wave motion are out of phase with each other and can be used to drive one or more pumps. It is configured to maintain a fixed orientation with respect to the direction of wave motion and is adapted, on the basis of local wave characteristics, to maximize the average power output. This adaptation may be provided by means including initial selection of the overall size of the apparatus and subsequent adjustments made to the pumping mechanism. The preferred pumping arrangement employs three pumps, each having a piston with one end removably pivotally attached to a pumping arm near one of the floats. Each piston reciprocates, with a stroke much longer than its diameter, within a respective neutrally buoyant cylinder that is pivotally attached to a body float.

Applicant believes that another reference corresponds to U.S. Pat. No. 6,020,653 issued to Woodbridge, et al. on Feb. 1, 2000 for Submerged Reciprocating Electric Generator. However, it differs from the present invention because Woodbridge, et al. teaches a submerged reciprocating electric generator placed below the ocean surface and creates electric power from the surface ocean swells. The generator coil reciprocates linearly in response to an external force acting on a float by passing ocean swells. A cable connects the float on the ocean surface with the reciprocating coil of the submerged generator. A magnetic field is focused through the coil as it reciprocates, creating an electromotive force in the coil. The magnetic field is created in such a manner as to provide uniform field of a single magnetic orientation throughout the entire length of motion of the reciprocating coil. The generator includes a base formed on the ocean floor supporting magnetic core having a generator coil movably mounted therein and connected to a float with a cable passing through cable alignment bearings. Electromagnetic windings are mounted at the closed end of the generator magnetic flux core.

Applicant believes that another reference corresponds to U.S. Pat. No. 5,921,082 issued to Berling on Jul. 13, 1999 for Magnetically Powered Hydro-Buoyant Electric Power Generating Plant. However, it differs from the present invention because Berling teaches a hydro-buoyant electrical power generating plant that generates electricity from a source of hydraulic pressure. The energy that pressurizes the hydraulic fluid is derived from movements of a crane-like class II lever that has its fulcrum fixed to a stationary land mass so that the fulcrum's position is fixed relative to the lever's opposite "movable" end where the applied load is established. The movable end of the lever is attached to an "applied force vessel" that alternatively can be filled with water (or other liquid) so as to sink due to gravity, and then can be evacuated of water so as to rise due to buoyancy. When the applied force vessel is at its position of greatest elevation, the interior chamber of the vessel initially would be filled with air, typically at atmospheric pressure. Valves mounted to the bottom and top of the vessel are then opened to allow liquid to enter the vessel from beneath the vessel, thereby allowing the vessel (and its attached lever) to sink to its point of least elevation. At its uppermost position, the vessel of the preferred embodiment is floating, and thereby displacing its own weight. While the vessel is sinking, the mechanical motion of the attached lever creates power that will be used to drive linear hydraulic actuators (e.g., double acting single ended actuators) that in turn will be used to displace and pressurize a hydraulic fluid. This hydraulic fluid can then be taken directly to a hydraulic motor, which can be used to drive an electrical generator, or the pressurized fluid can be stored indefinitely in hydraulic accumulators. Once the applied force vessel reaches its bottom-most position, the valves below and above the vessel are closed, and multiple submersible pumps attached around the vessel's bottom surface periphery begin to pump the liquid that is presently contained within the vessel out to the surrounding medium (i.e., the infinite liquid). As the liquid is pumped out of the vessel, the vessel becomes buoyant, and a buoyancy stroke can now be started and the entire lever and vessel structure begins to rise in the vertical direction. While the vessel is rising, the mechanical motion of the attached lever creates power that again will be used to drive the double acting linear hydraulic actuators.

Applicant believes that another reference corresponds to U.S. Pat. No. 5,710,464 issued to Kao, et al. on Jan. 20, 1998 for Power Drive System for Converting Natural Potential Energy into a Driving Power to Drive a Power Generator. However, it differs from the present invention because Kao, et al. teaches a power drive system, which includes a water collecting barrel vertically fastened to the oceanic crust under the sea level and having a reduced top end connected to the power input port of a power generator; a plurality of water tubes radially connected to the water collecting barrel for guiding sea water to the power input port of the power generator to move it into operation; a plurality of rockers respectively pivoted to the water collecting barrel; a plurality of floating devices floating on the sea level; a plurality of connecting rods connected between the floating devices and the rocker; and water pump means driven by the rockers to pump water into the water tubes and the water collecting barrel to force the power generator into operation.

Applicant believes that another reference corresponds to U.S. Pat. No. 4,672,222 issued to Ames on Jun. 9, 1987 for Ocean wave energy converter. However, it differs from the present invention because Ames teaches a self-stabilized and modularly expandable system of independently operative point absorbers with respective drive transmissions and electrical generators that produces electricity from wave motion on a body of water.

Applicant believes that another reference corresponds to U.S. Pat. No. 5,461,862 issued to Ovadia on Oct. 31, 1995 for System for Conversion of Sea Wave Energy. However, it differs from the present invention because Ovadia teaches a system for the conversion of sea wave energy including a breakwater structure including a wave energy collector integrally formed within the breakwater structure. The energy collector collects and directs oncoming waves to an upwardly extending duct having hydraulic oil separated from seawater by a membrane for converting the wave energy into oil pressure. The wave energy collector incorporates a plurality of control valves, which are electronically coupled through a computerized control system, which regulate the control valves so that the optimum wave pressure is collected and transferred to the hydraulic oil. A piping system conducts the pressurized hydraulic oil to a pressure tank, which is connected to a hydraulic motor, which is mechanically coupled to an electric generator. The system may be combined with a solar distillation apparatus.

Applicant believes that another reference corresponds to U.S. Pat. No. 4,363,213 issued to Paleologos on Dec. 14, 1982 for Combined Body and Power Generating System. However, it differs from the present invention because Paleologos teaches a system for converting a standard buoy design into an electrical power producing apparatus. The vertical arms slide in sleeves attached to the buoy body and terminate in feet in the form of flat discs. As the buoy bobs and pivots in the water, the resistance of the feet to motion causes the arms to reciprocate, operating pneumatic piston pumps within the buoy. These piston pumps power pneumatic turbines, which activate generators for producing electrical power. The moving parts of the linkages connecting the arms to the pumps are protected by a plastic casing, which keeps out seawater. The casing includes facets, which act as sails. Annular wipers are provided between the arms and sleeves within which the arms reciprocate, so as to prevent seawater from seeping therebetween.

Applicant believes that another reference corresponds to U.S. Pat. No. 4,242,593 issued to Quilico, et al. on Dec. 30, 1980 for Device for Converting Sea Wave Energy into Electrical Energy. However, it differs from the present invention because Quilico, et al. teaches a device for converting sea wave energy into electrical energy that comprises a floating platform carrying a pulley, which is connected through a free-wheel coupling and a speed multiplier to a drive shaft of an electrical generator, on which a flywheel is mounted. An anchor cable passes over the pulley and suspends at its free end an immersed counterweight so that vertical motion of the platform in the sea causes rotation of the pulley and drives the generator continuously.

Applicant believes that another reference corresponds to U.S. Pat. No. 4,232,230 issued to Ames on Nov. 4, 1980 for Ocean Wave Energy Converter. However, it differs from the present invention because Ames teaches a modular assembly of reciprocating electric generators with respective movable floats and a common submerged damper plate and buoyancy chamber that produces electricity from wave motion on a body of water.

Applicant believes that another reference corresponds to U.S. Pat. No. 4,203,294 issued to Budal, et al. on May 20, 1980 for System for the Conversion of Sea Wave Energy. However, it differs from the present invention because Budal, et al. teaches a system for conversion of sea wave energy to useful energy comprising a water displacing member adapted to be at least in part submerged in the sea and mechanically secured to solid ground and provided with means to so control the movement of the water displacing member that it is locked relative to the ground during selected time periods of each cycle of such waves to which the water displacing member is subjected, for the purpose of thereby controlling the rotational movement of an electric generator through at least one fluid under controlled circulation within the water displacing member.

Applicant believes that another reference corresponds to U.S. Pat. No. 4,078,871 issued to Perkins, Jr. on Mar. 14, 1978 for Sea Wave Energy Conversion. However, it differs from the present invention because Perkins, Jr. teaches a fixed structure that encloses a vertically spaced plurality of superimposed channels that are open at one end of the sea to receive deep sea waves approaching a shoreline. Each of the channels has an entrance ramp that slopes upwardly shorewardly to induce breaking of a wave at and over an apex of trailer service ramp that merges into a shorewardly downwardly sloping convergent conduit having fluid communication with a pressure chamber of the structure through a one-way valve controlled aperture at which the wave energy is concentrated. A portion of each ramp is overlain by a roof, which may comprise the underside of a superimposed ramp of another channel. Each of the ramps is of upwardly convex configuration, transversely to the wave direction, and at opposite sides is provided with re-entrant scuppers for draining backwash from a receding wave. Wave focusing vanes or walls diverge seawardly from the open end of the fixed structure along an axis bisecting a submerged transverse wall member embedded on the sea floor, of a lens configuration for bending and focusing a given linear wave length into the convergent walls. Water is directed from the pressure chamber of the structure into energy recovery devices utilizing the kinetic, hydrostatic and pneumatic energy contained in the pressure chamber, which acts as an accumulator.

Applicant believes that another reference corresponds to U.S. Pat. No. 3,970,415 issued to Widecrantz, et al. on Jul. 20, 1976 for One Way Valve Pressure Pump Turbine Generator Station. However, it differs from the present invention because Widecrantz, et al. teaches a power generating plant that utilizes the motion of ocean waves to drive turbine generators in a power station; the plant including a series of underwater units each of which includes a hollow sphere that floats upon the water so that it rises and falls as waves move by, the ball being mounted on an end of a pivoting arm to which there is connected a piston slidable in a cylinder so to pump ocean water through a duct to the turbines in the power station.

Applicant believes that another reference corresponds to U.S. Pat. No. 1,223,184 issued to Larson on Apr. 17, 1917 for Wave Motor. However, it differs from the present invention because Larson teaches a wave motor including a float having direct connection with a compressor and vertically adjustable means for pivotally supporting the pump and float.

Applicant believes that another reference corresponds to European Patent No. 1682776(A1) issued to Resen, et al. in July 2007 for a Wave Power Apparatus Comprising a Plurality of Arms Arranged to Pivot With a Mutual Phase Shift. However, it differs from the present invention because Resen, et al. teach a wave power apparatus that has at least one arm (122), the arm being rotationally supported at one end by a pair of pre-stressed, essentially slack-free bearings (142) and carrying a float (124) at its other end, so that a translational movement of the float caused by a wave results in rotation of the arm. Power conversion means convert power transmitted from the wave to the arms into useful power. The bearing may comprise a flexible material (149) of flat spring (342; 352; 362; 372; 374) allowing rotation or wriggling of the arm (122) around a supporting shaft (126). The apparatus may comprise a plurality of arms, which are supported by individual pairs of bearings.

Applicant believes that another reference corresponds to WIPO Publication No. WO/2006/100436 published to Aquamarine Power Limited, et al. on Sep. 28, 2006 for Apparatus and Control System for Generating Power From Wave Energy. However, it differs from the present invention because Aquamarine Power Limited, et al. teach a wave energy conversion device (1), for use in relatively shallow water, which has a base portion (2) for anchoring to the bed of a body of water (6) and an upstanding flap portion (8) pivotally connected (12) to the base portion. The flap portion is biased to the vertical and oscillates backwards and forwards about the vertical in response to wave motion acting on its faces. Power extraction means extract energy from the movement of the flap portion. When the base portion (2) is anchored to the bed of a body of water (6) with the flap portion (8) facing the wave motion, the base portion (2) and the flap portion (8) extend vertically through at least the entire depth of the water, to present a substantial. Other patents describing the closest subject matter provide for a number of more or less complicated features that fail to solve the problem in an efficient and economical way. None of these patents suggest the novel features of the present invention.

III. SUMMARY OF THE INVENTION

The present invention provides for an onshore hydrokinetic system that is capable of harnessing energy from water waves by employing a plurality of specially designed floats, whereby a summation of intrinsic water wave forces is exploited. This is achieved by their combined functions and advantages, which are constituted by their body-mass, shape, arrangement, movable parts, and method of use within the system. A correctly proportioned body-mass of a traditional float will always achieve net-upward buoyancy by nature. However, the plurality of specially designed floats are designed and arranged to absorb energy from water waves while taking into consideration their force and speed, even when traveling into shallow waters. This also includes great volumes of inland bodies of water where wind may provoke significant waves.

More specifically, the instant invention is a system to harness energy from water waves, comprising a frame assembly. The frame assembly has a moving frame assembly mounted upon vertical guide rails. The moving frame assembly comprises at least first and second arms rotatably mounted thereon. The first and second arms terminate at a mounting plate. The moving frame assembly travels upon the vertical guide rails. A first hydraulic system comprises at least one first cylinder and respective first piston. The first cylinder is fixedly mounted onto the frame assembly and the respective first piston is fixedly mounted onto the moving frame assembly. A second hydraulic system comprises a hydraulic motor, and at least one second cylinder and respective second piston. The second cylinder is rotatably mounted onto the first and second arms and the respective second piston is rotatably mounted onto the moving frame assembly. At least one float assembly comprises front, rear, bottom, top, and first and second lateral faces. The float assembly further comprises a trailing face. The front face extends upwardly from the bottom face at a first predetermined angle. The trailing face extends upwardly from the top face at a second predetermined angle. The trailing face and the rear face merge to define an edge. The float assembly is mounted onto the mounting plate. The float assembly is placed in a body of water that comprises wave forces. An electrical system comprises a generator. The generator produces electricity when driven by the hydraulic motor when hydraulic fluid is displaced and pressurized within the second hydraulic system when the wave forces cause the float assembly to move when in the body of water.

The float assembly further comprises a central body that is buoyant. The float assembly further comprises a compact mass internally housed within the central body. The float assembly further comprises a frame to secure the compact mass to the first and second arms. The float assembly further comprises a plate connector that extends from the compact mass to the mounting plate. The float assembly further comprises a pin connector that extends from the frame to the first and second arms.

The first hydraulic system comprises a control valve. The moving frame assembly is placed in a raised position to lift the float assembly from the body of water with the first hydraulic system, and is placed in a lowered position to lower the float assembly into the body of water also with the first hydraulic system. The frame assembly comprises a platform having doors to access the moving frame assembly. The platform is positioned above the moving frame assembly. The frame assembly comprises a housing assembly fixed upon the platform. In a preferred embodiment, the housing assembly houses the hydraulic motor and the generator. The electrical system comprises weather-monitoring equipment, and the frame assembly is anchored to floor of the body of water.

It is therefore one of the main objects of the present invention to provide a system for harnessing energy from water waves.

It is another object of this invention to provide a system to obtain energy from water waves that is eco-friendly.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a front view of the present invention.

FIG. 3 is a rear view of the present invention.

FIG. 4A shows a first partial front view of the present invention as shown in FIG. 2.

FIG. 9B is a side elevation view of the float assembly represented in FIG. 9A, which has been partially cross-sectioned.

FIG. 9C is a rear elevation view of the float assembly represented in FIG. 9A, which has been partially cross-sectioned.

V. DETAILED DESCRIPTION OF THE PREFERRED EMBODIMENT

Figure 1:
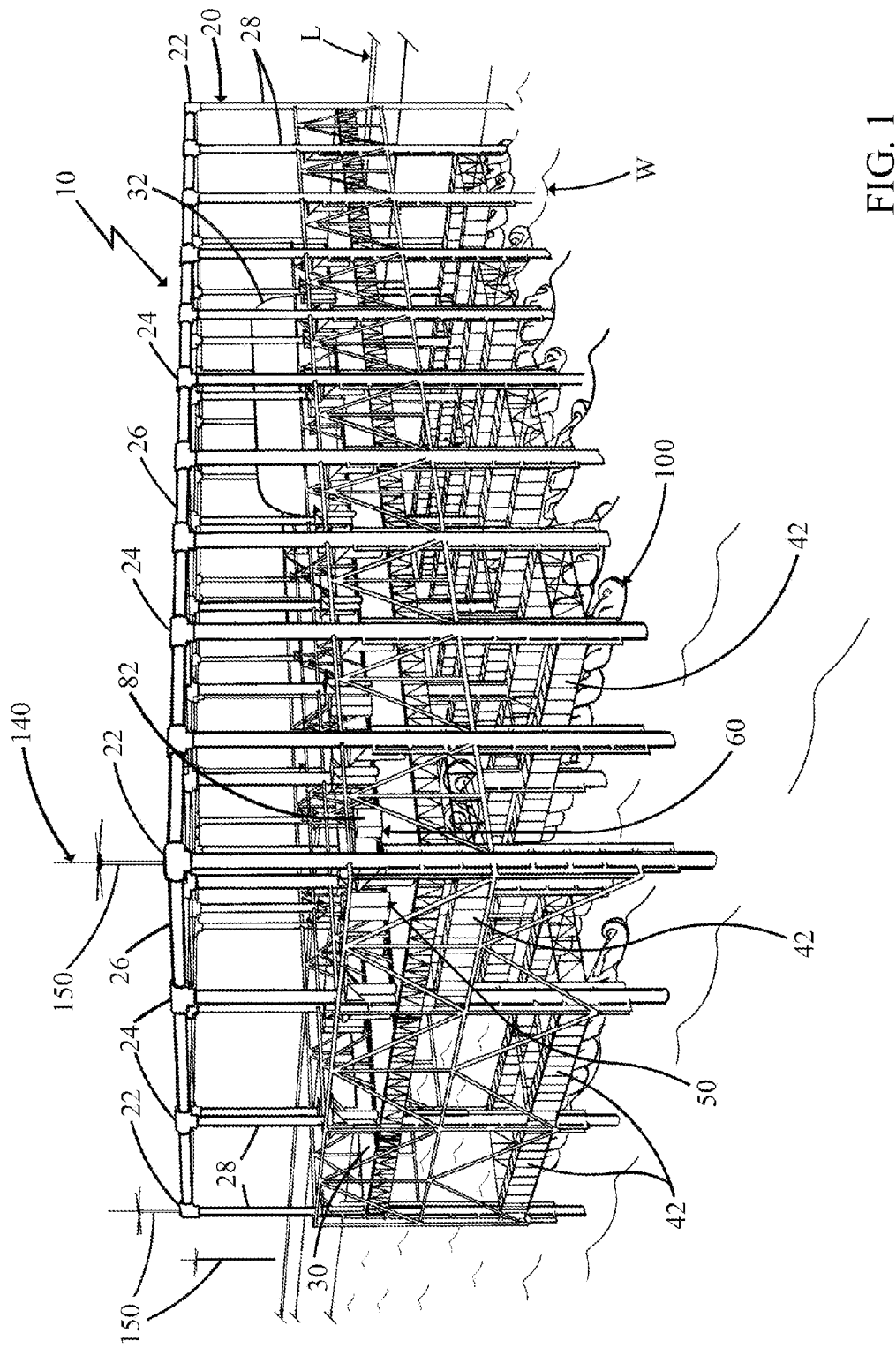
FIG. 1 is a perspective view of the system to obtain energy from water waves, object of the instant application.

Referring now to the drawings, the present invention is generally referred to with numeral 10. It can be observed that it basically includes frame assembly 20, moving frame assembly hydraulic system 50, hydraulic system 60, float assembly 100, and electrical system 140.

As seen in FIGS. 1, 2, and 3, present invention 10 is a system to harness energy from water waves W. Frame assembly 20 is anchored to floor F of a body of water. In one configuration, frame assembly 20 defines a rectangular shape as seen in this illustration. However, it is noted that frame assembly 20 may define various shapes and not necessarily rectangular. Frame assembly 20 comprises a plurality of horizontal frame members 26 that are connected to one another by connecting joints 24. At the corners of frame assembly 20, horizontal frame members 26 connect to one another by corner joints 22. Frame assembly 20 further comprises a plurality of vertical frame members 28 that are connected to one another by connecting joints 24. At the corners of frame assembly 20, vertical frame members 28 connect to one another by corner joints 22. Frame assembly 20 further comprises platform 30 that is positioned above moving frame assembly 42. Although not illustrated, platform 30 has access doors to access moving frame assembly 42. Platform 30 may be grated to prevent water accumulation, and provide minimal wind resistance. Frame assembly 20 also comprises housing assembly 32 that is fixed upon platform 30. Housing assembly 32 houses hydraulic motor 64 and generator 142. In a preferred embodiment, frame assembly 20 is made of non-corrosive materials, which are strong enough to resist extreme weather conditions. It is noted that frame assembly 20 provides minimal wind resistance.

Electrical system 140 comprises generator 142. In addition, electrical system 140 comprises weather-monitoring equipment. Such weather-monitoring equipment includes computer system 146, high-frequency radar 148, and antennas 150. Although not illustrated, it is noted that electrical system 140 also comprises means to operate and power instant invention 10. Such means may include computers having computer programs as an example. Generator 142 produces electricity when driven by hydraulic motor 64 when hydraulic fluid is displaced and pressurized within hydraulic system 60 when horizontal wave forces W' and vertical wave forces W", best seen in FIG. 8, cause each float assembly 100 to move when in the body of water. Such a body of water can be any significant accumulation of water having waves W. The term body of water most often refers to large accumulations of water, such as oceans, seas, and lakes but it may also include smaller accumulations of water. Some bodies of water can be man-made (artificial), such as reservoirs or harbors.

As seen in FIGS. 4A and 4B, and 5A and 5B, a first hydraulic system is defined as moving frame assembly hydraulic system 50. Moving frame assembly hydraulic system 50 comprises cylinders 52 having respective pistons 54. Cylinders 52 are fixedly mounted onto frame assembly 20 and pistons 54 are fixedly mounted onto moving frame assembly 42. Moving frame assembly hydraulic system 50 further comprises control valves 56.

Figure 4B:
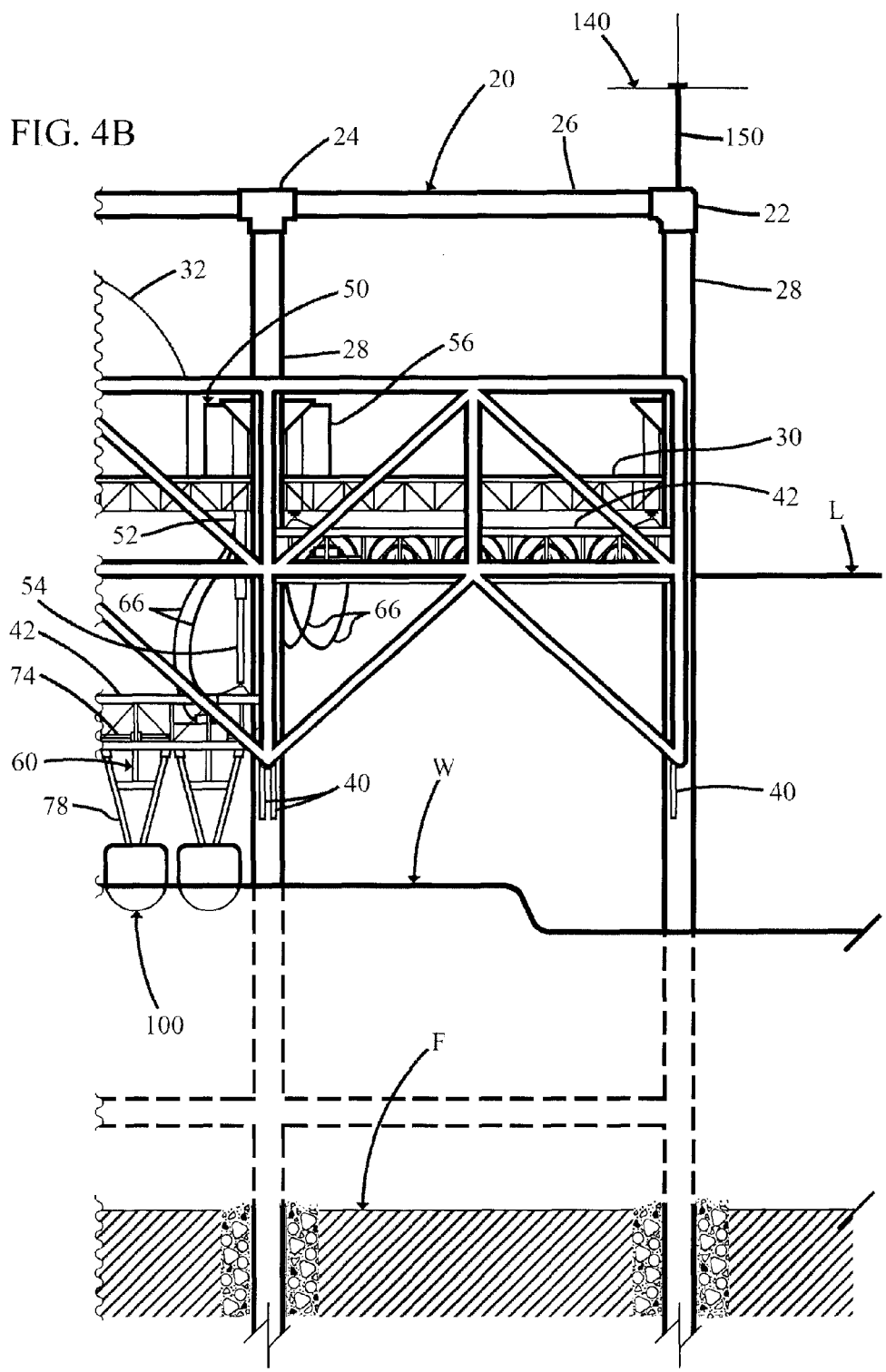
FIG. 4B shows a second partial front view of the present invention as shown in FIG. 2.

As best seen in FIG. 4B, a section of moving frame assembly 42 is placed in a raised position to lift float assemblies 100 from the body of water with moving frame assembly hydraulic system 50. Float assemblies 100 may be raised from the body of water in the event of foul weather, or for maintenance as an example. As mentioned above, platform 30 has the access doors to access moving frame assembly 42 to inspect or otherwise perform maintenance of the moving frame assembly 42, float assemblies 100, or other surrounding equipment. In the same illustration, another section of moving frame assembly 42 is in a lowered position to lower float assemblies 100 into the body of water.

Moving frame assemblies 42, cylinders 52, and corresponding float assemblies 100 are independently enumerated to be identifiable by a computer program, not seen. When any specific cylinder 52 or corresponding float assembly 100 switch is pressed, not seen, a related analog sensor emits a signal with data work to a computer, not seen, where its activity is analyzed. The activity analyzed is for detecting a possible malfunction, or if abnormal conditions are detected as an example. In the event of either above, frame assemblies 42 are automatically placed in the raised position, and a program emits an assistance required alert with an exact location for maintenance. The computer also has means to record the activity of each float assembly 100. Furthermore, the computer system is programmed with tidal information of the body of water to adjust the elevation of the float assemblies thereon for variations in high tides, low tides, and in between same.

Figure 5A:
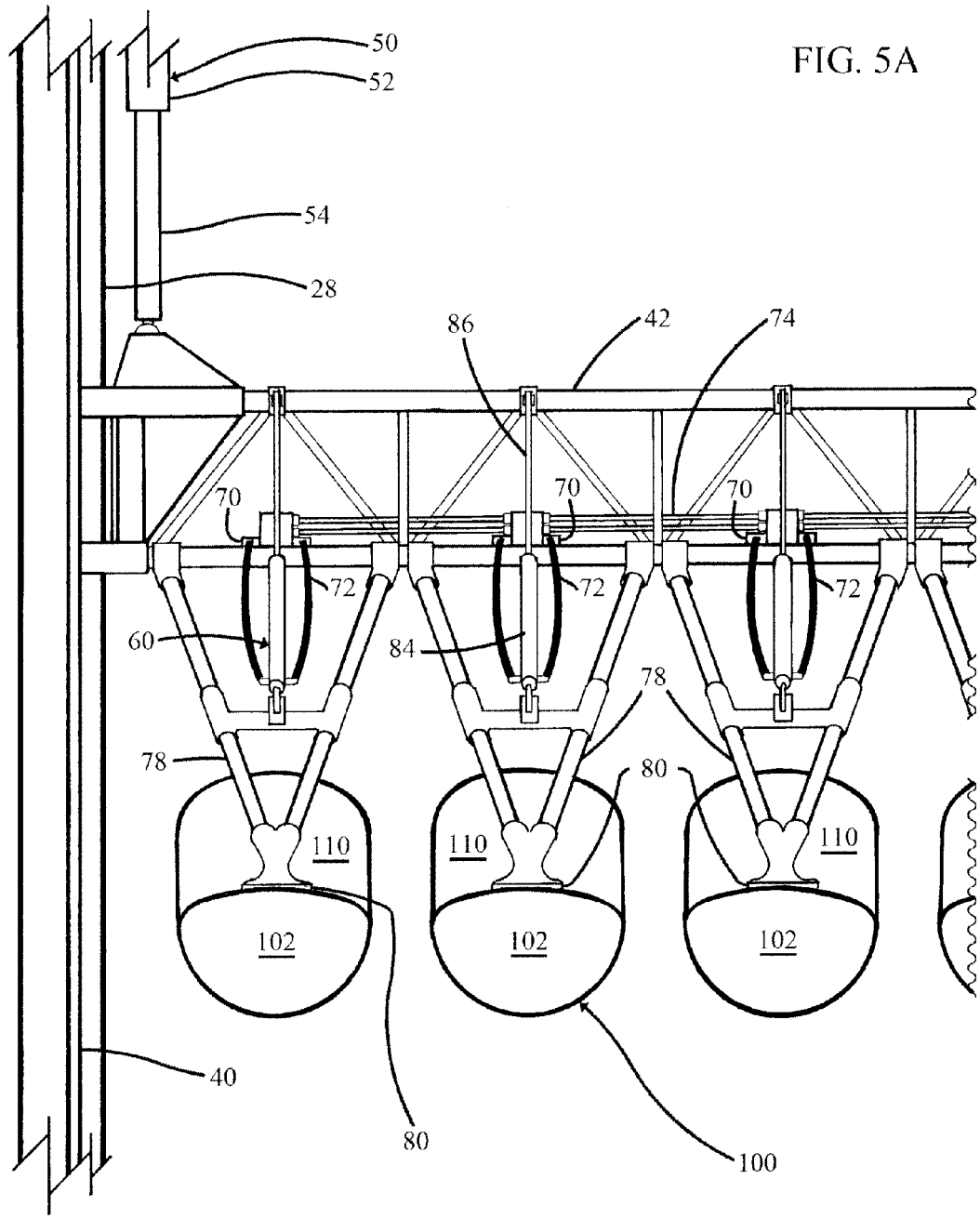
FIG. 5A shows a first partial rear view of the present invention as shown in FIG. 3.
Figure 5B:
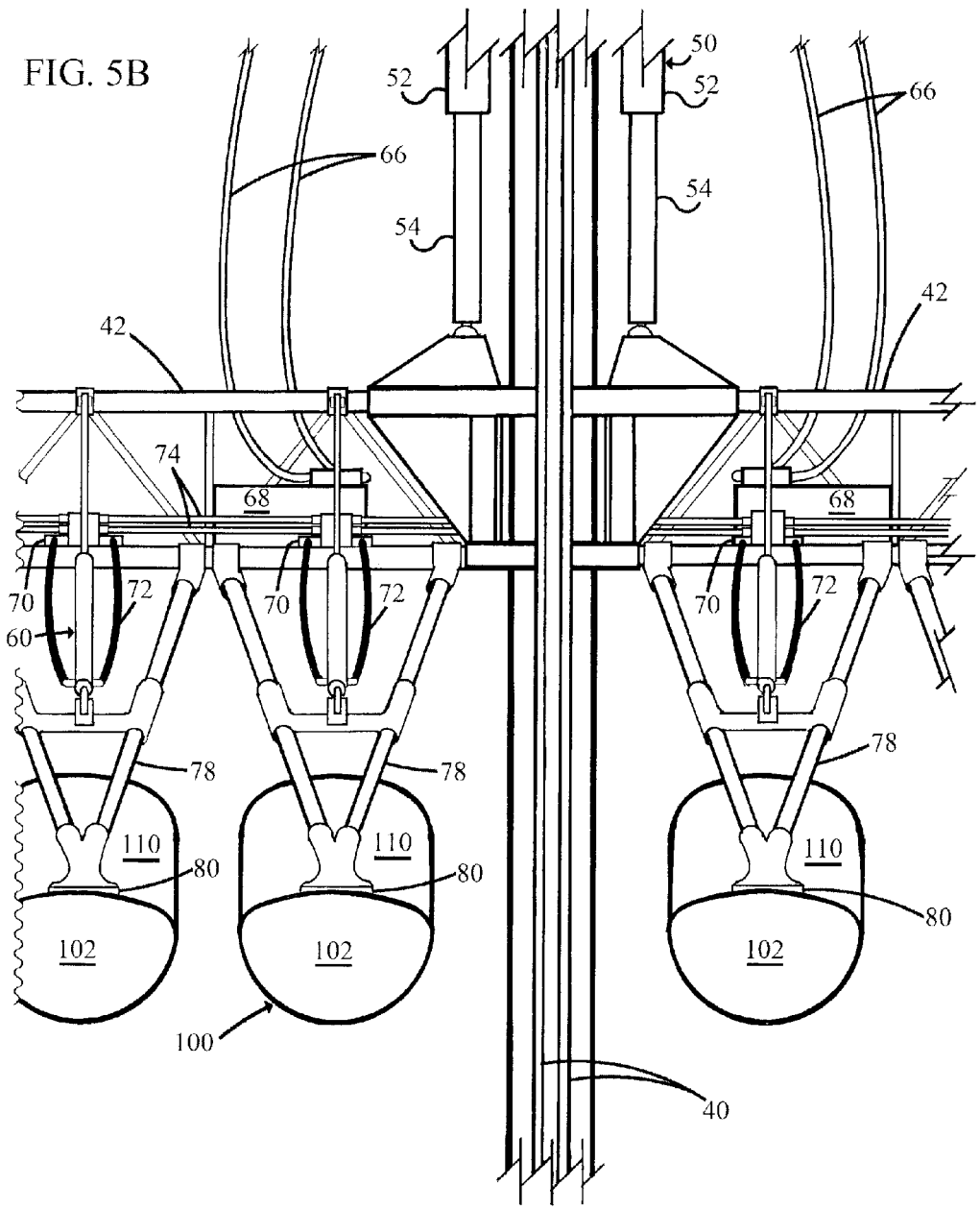
FIG. 5B shows a second partial rear view of the present invention as shown in FIG. 3.

As best seen in FIGS. 5A and 5B, moving frame assembly 42 is mounted upon vertical guide rails 40. Moving frame assembly 42 comprises arms 78 rotatably mounted thereon. Arms 78 terminate at mounting plate 80. Moving frame assembly 42 travels upon vertical guide rails 40.

A second hydraulic system is defined as hydraulic system 60. Hydraulic system 60 comprises hydraulic motor 64, and cylinders 84 having respective pistons 86. Cylinders 84 are rotatably mounted onto arms 78 and pistons 86 are rotatably mounted onto moving frame assembly 42. Hydraulic system 60 further comprises hoses 72 that extend from cylinders 84 to check valves 70. Metal tubing 74 connects check valves 70 and transports hydraulic fluid to pressure control valves 68. Hydraulic hoses 66 extend from pressure control valves 68 and are routed to transport the hydraulic fluid to control valves 82, seen in FIG. 6. Additional hydraulic hoses, not seen, extend from control valves 82 and are routed to transport the hydraulic fluid to master control valve 62, seen in FIG. 3.

Figure 6:
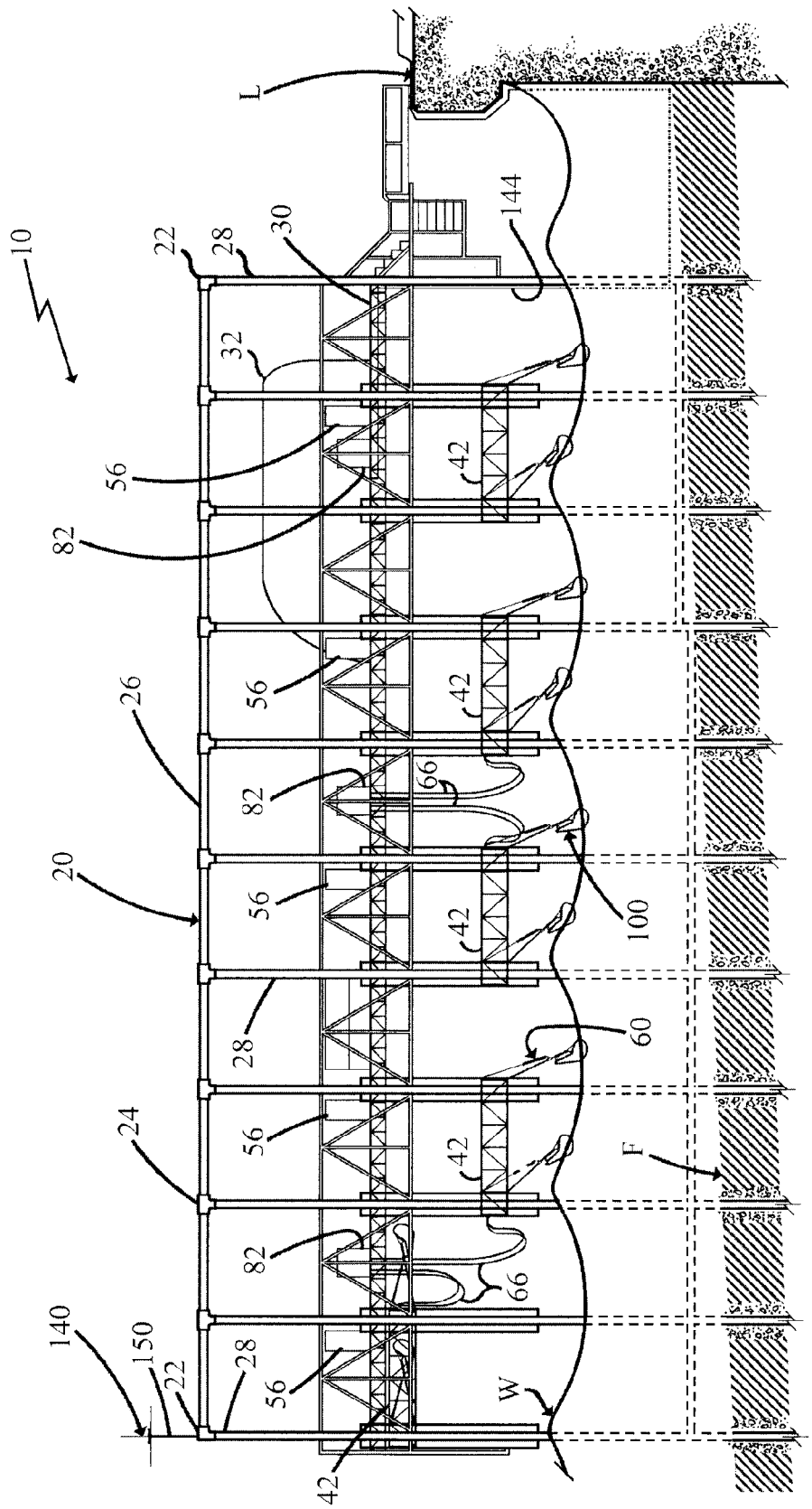
FIG. 6 is a side view of the instant invention.

As best seen in FIG. 6, instant invention 10 may comprise a plurality of moving frame assemblies 42 mounted upon vertical guide rails 40, which are mounted onto frame assembly 20, and each moving frame assembly 42 may comprise a plurality of float assemblies 100. Instant invention 10 in a preferred embodiment is positioned near land L. Electrical system 140 further comprises electrical cables 144 to transmit the electricity produced by generator 142. The elevation of moving frame assembly 42, and consequently float assemblies 100, is predetermined based on tidal history and weather record valuation of the body of water.

It is noted that cylinders 84 have a sufficient internal hydraulic pressure force so as to keep each float assembly 100 partially submerged into the body of water as seen in this illustration. However, that internal hydraulic pressure force is less than an upward buoyancy force created by the buoyancy of float assembly 100.

Figure 7A:
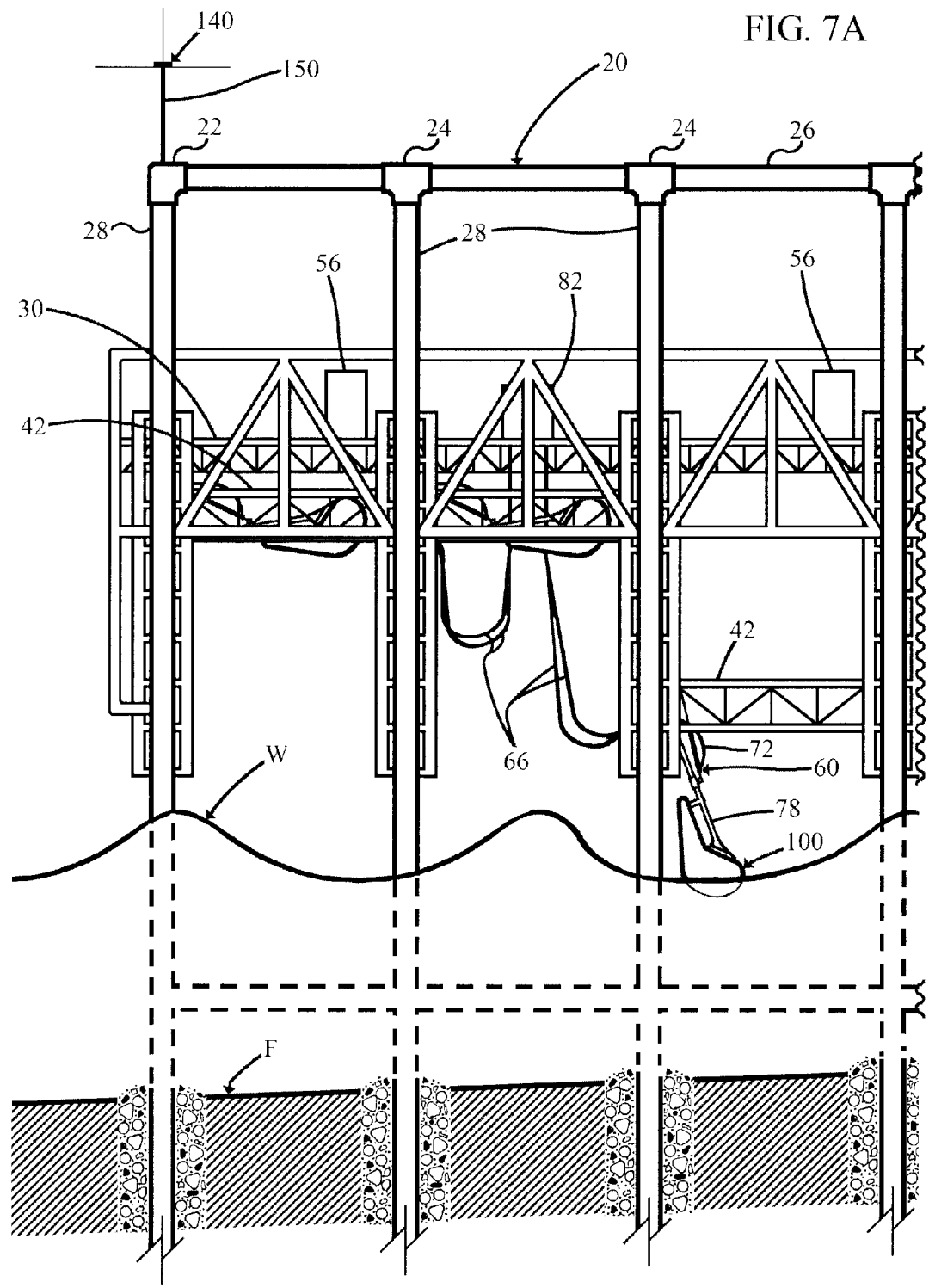
FIG. 7A shows a first partial side view of the present invention as shown in FIG. 6.
Figure 7B:
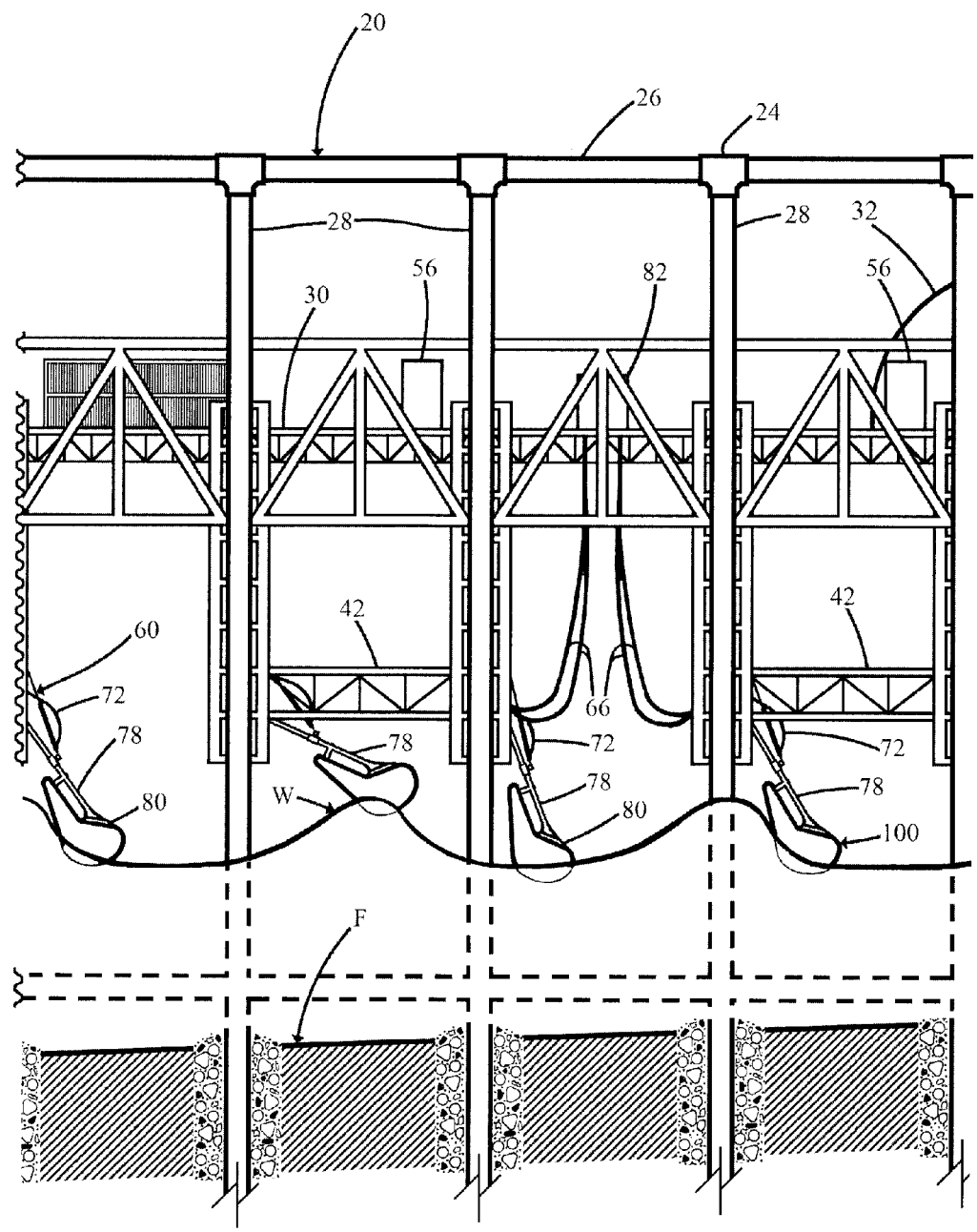
FIG. 7B shows a second partial side view of the present invention as shown in FIG. 6.

As seen in FIGS. 7A and 7B, moving frame assemblies 42 are independent from each other, meaning that some moving frame assemblies 42 may be in a raised positioned to raise float assemblies 100 from the body of water, and some moving frame assemblies 42 may be in a lowered positioned to lower float assemblies 100 into the body of water.

Figure 8:
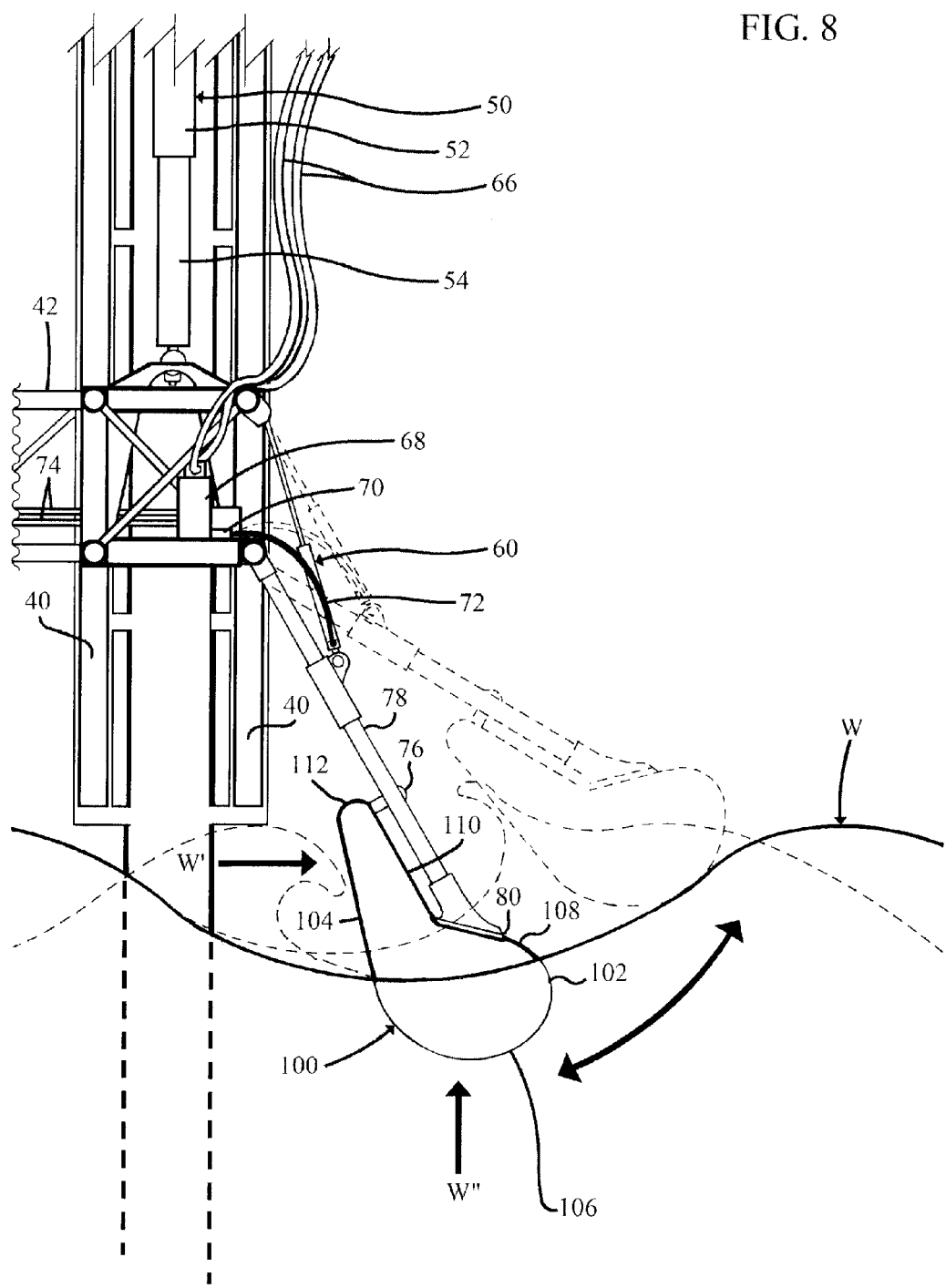
FIG. 8 shows a side view of a float assembly in operation.

As best seen in FIG. 8, generator 142 produces electricity when driven by hydraulic motor 64 when hydraulic fluid is displaced and pressurized within hydraulic system 60 when horizontal wave forces W' and vertical wave forces W" cause each float assembly 100 to move when in the body of water. Although not illustrated, waves W may comprise additional directional forces affecting horizontal wave forces W' and vertical wave forces W" that also cause each float assembly 100 to move when in the body of water. In the preferred embodiment, float assemblies 100 move vertically.

Figure 9A:
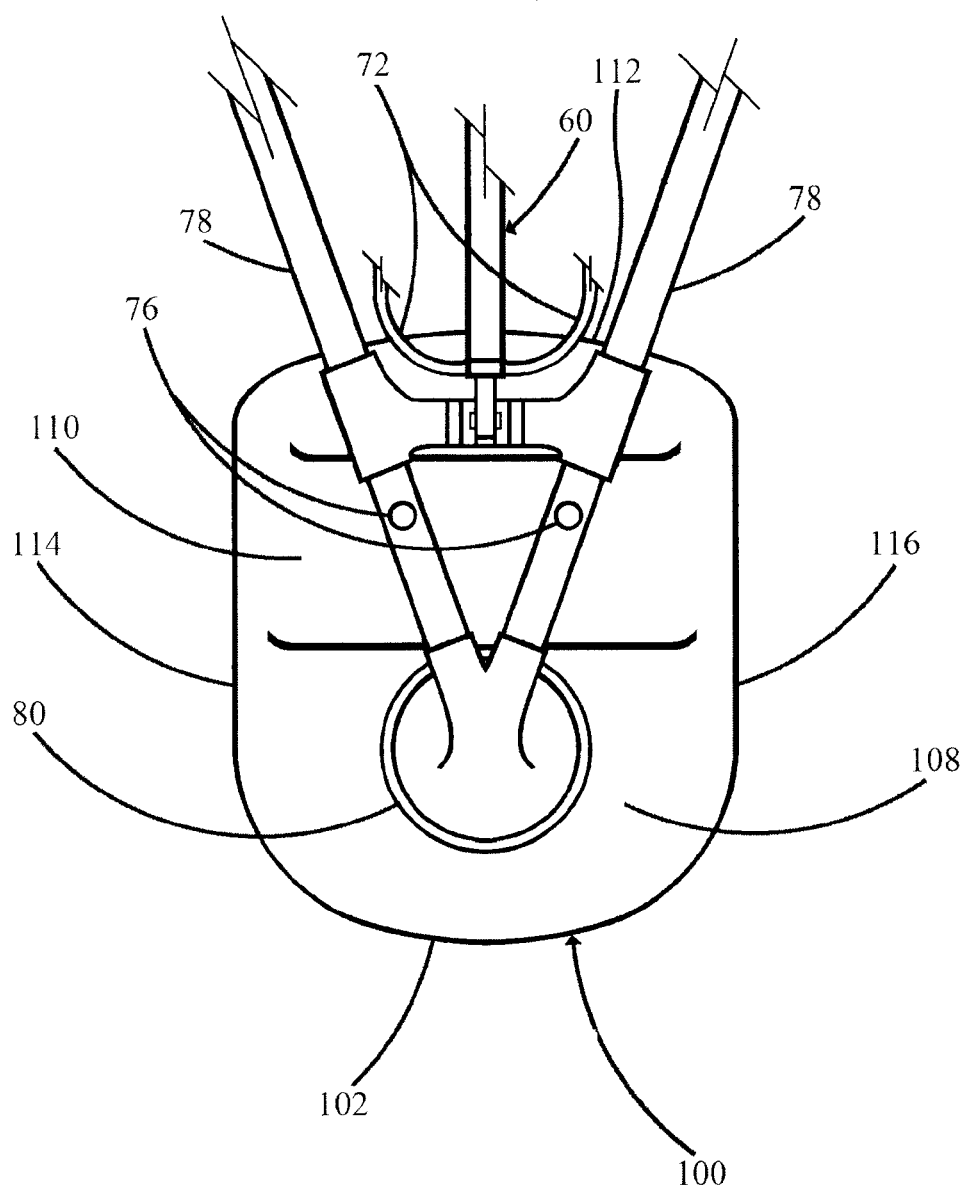
FIG. 9A is a top view of the float assembly.

As best seen in FIGS. 9A, 9B, and 9C, float assembly 100 comprises front face 104, rear face 102, bottom face 106, top face 108, and first and second lateral faces 114 and 116. Float assembly 100 further comprises trailing face 110. Front face 104 extends upwardly from bottom face 106 at a first predetermined angle. Trailing face 110 extends upwardly from top face 108 at a second predetermined angle. Front face 104 and trailing face 110 merge to define edge 112. Float assembly 100 is mounted onto mounting plate 80. Float assembly 100 further comprises foam central body 118, which is buoyant. Float assembly 100 further comprises compact internal mass 120 housed within foam central body 118. Frame 122 is rigid and secures float assembly 100 to arms 78 with pin connector 126 and pin 76, whereby pin connector 126 extends from frame 122 to arms 78. Plate connector 124 extends from compact internal mass 120 to mounting plate 80.

Float assemblies 100 are designed with special shape and materials selection. Foam central body 118 is made of closed-cell urethane foam. Compact internal mass 120 can be an antirust-treated encapsulated steel core-anchor epoxy coated or hot-dipped galvanized. The exterior surface of front face 104, rear face 102, bottom face 106, top face 108, first and second lateral faces 114 and 116, trailing face 110, and edge 112 are preferably made of synthetic polymer filament reinforced with polyurethane. The shapes of bottom face 106 and top face 108 create a surface where water is not retained. Furthermore, the shape of float assembly 100 achieves a hi-net upward buoyancy force. Specifically, front face 104 extends upwardly from bottom face 106 at the first predetermined angle to optimize the impact of horizontal wave forces W' and vertical wave forces W" and the additional directional forces affecting horizontal wave forces W' and vertical wave forces W".

Figure 10:
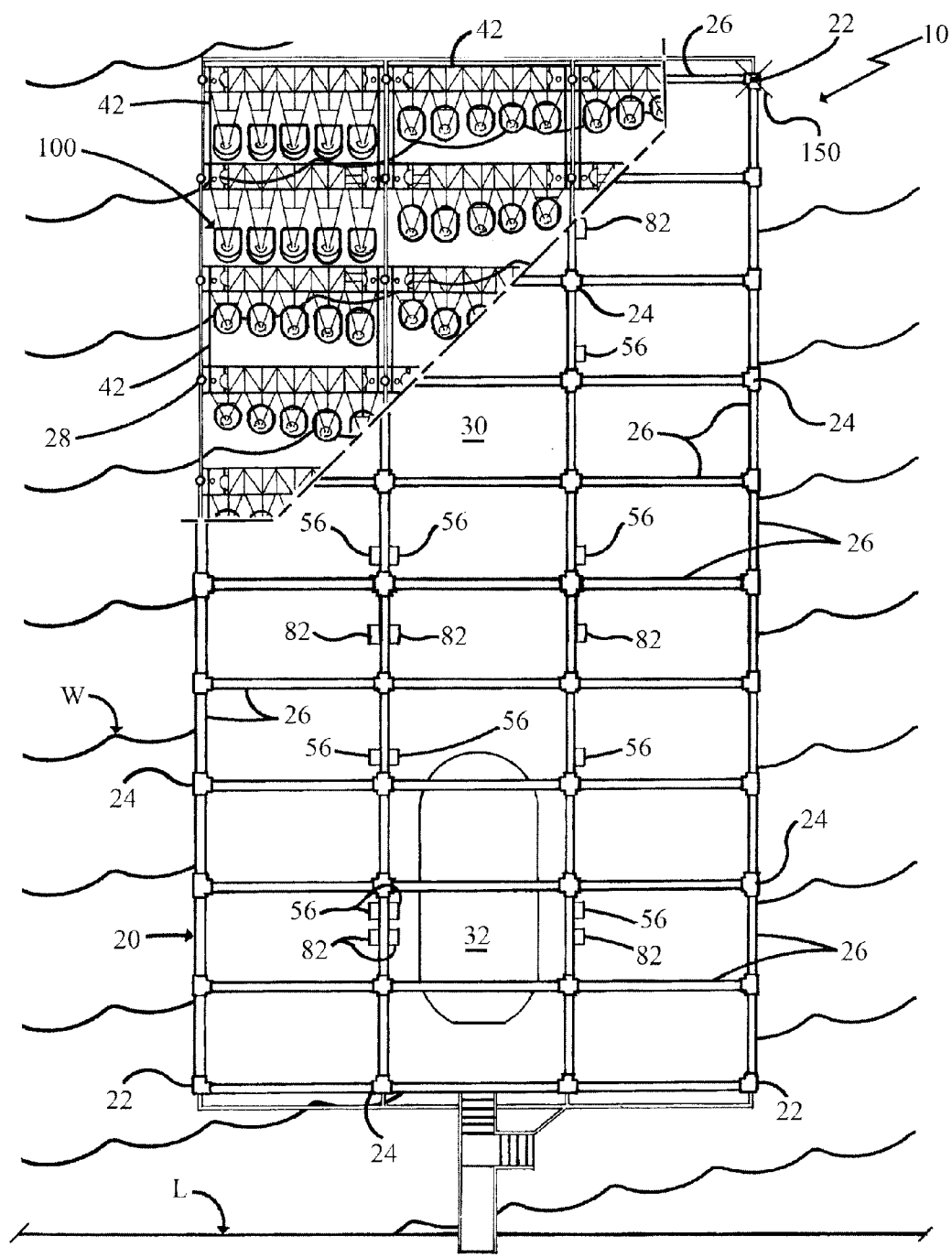
FIG. 10 is a top plan view of the present invention, which has been partially cross-sectioned to show the disposition of the float assemblies.

As seen in FIG. 10, frame assembly 20 may comprise a plurality of rows and columns to increase the number of moving frame assemblies 42 that comprise a plurality of float assemblies 100 for increased production of electricity. In operation, instant invention 10 produces large amounts of electrical power.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system to harness energy from water waves, comprising:
   A) a frame assembly comprising a moving frame assembly mounted upon vertical guide rails, said moving frame assembly comprising at least first and second arms rotatably mounted thereon, said at least first and second arms terminate at a mounting plate, said moving frame assembly travels upon said vertical guide rails;
   B) a first hydraulic system comprising at least one first cylinder and respective first piston, said at least one first cylinder is fixedly mounted onto said frame assembly and said respective first piston is fixedly mounted onto said moving frame assembly;
   C) a second hydraulic system comprising a hydraulic motor, and at least one second cylinder and respective second piston, said at least one second cylinder is rotatably mounted onto said at least first and second arms and said respective second piston is rotatably mounted onto said moving frame assembly;
   D) at least one float assembly comprising front, rear, bottom, top, and first and second lateral faces, said at least one float assembly further comprising a trailing face, said front face extends upwardly from said bottom face at a first predetermined angle, said trailing face extends upwardly from said top face at a second predetermined angle, said front face and said trailing face merge to define an edge, said at least one float assembly is mounted onto said mounting plate, said at least one float assembly is placed in a body of water that comprise wave forces; and
   E) an electrical system comprising a generator, said generator produces electricity when driven by said hydraulic motor when hydraulic fluid is displaced and pressurized within said second hydraulic system when said wave forces cause said at least one float assembly to move when in said body of water.

2. The system to harness energy from water waves set forth in claim 1, further characterized in that said at least one float assembly further comprises a central body.

3. The system to harness energy from water waves set forth in claim 2, further characterized in that said central body is buoyant.

4. The system to harness energy from water waves set forth in claim 3, further characterized in that said at least one float assembly further comprises a compact mass internally housed within said central body.

5. The system to harness energy from water waves set forth in claim 4, further characterized in that said at least one float assembly further comprises a frame to secure to said first and second arms.

6. The system to harness energy from water waves set forth in claim 4, further characterized in that said at least one float assembly further comprises a plate connector that extends from said compact mass to said mounting plate.

7. The system to harness energy from water waves set forth in claim 5, further characterized in that said at least one float assembly further comprises a pin connector that extends from said frame to said first and second arms.

8. The system to harness energy from water waves set forth in claim 1, further characterized in that said first hydraulic system further comprises a control valve, said moving frame assembly is placed in a raised position to lift said at least one float assembly from said body of water with said first hydraulic system.

9. The system to harness energy from water waves set forth in claim 1, further characterized in that said first hydraulic system further comprises a control valve, said moving frame assembly is placed in a lowered position to lower said at least one float assembly into said body of water with said first hydraulic system.

10. The system to harness energy from water waves set forth in claim 1, further characterized in that said frame assembly comprises a platform positioned above said moving frame assembly, said platform having doors to access said moving frame assembly.

11. The system to harness energy from water waves set forth in claim 10, further characterized in that said frame assembly comprises a housing assembly fixed upon said platform, said housing assembly houses said hydraulic motor and said generator.

12. The system to harness energy from water waves set forth in claim 1, further characterized in that said electrical system comprises weather-monitoring equipment.

13. The system to harness energy from water waves set forth in claim 1, further characterized in that said frame assembly is anchored to floor of said body of water.

14. A system to harness energy from water waves, comprising:
A) a frame assembly comprising a moving frame assembly mounted upon vertical guide rails, said moving frame assembly comprising at least first and second arms rotatably mounted thereon, said at least first and second arms terminate at a mounting plate, said moving frame assembly travels upon said vertical guide rails;
B) a first hydraulic system comprising at least one first cylinder and respective first piston, said at least one first cylinder is fixedly mounted onto said frame assembly and said respective first piston is fixedly mounted onto said moving frame assembly;
C) a second hydraulic system comprising a hydraulic motor, and at least one second cylinder and respective second piston, said at least one second cylinder is rotatably mounted onto said at least first and second arms and said respective second piston is rotatably mounted onto said moving frame assembly;
D) at least one float assembly comprising front, rear, bottom, top, and first and second lateral faces, said at least one float assembly further comprising a trailing face, said front face extends upwardly from said bottom face at a first predetermined angle, said trailing face extends upwardly from said top face at a second predetermined angle, said front face and said trailing face merge to define an edge, said at least one float assembly is mounted onto said mounting plate, said at least one float assembly further comprises a buoyant central body, said at least one float assembly is placed in a body of water that comprise wave forces; and
E) an electrical system comprising a generator, said generator produces electricity when driven by said hydraulic motor when hydraulic fluid is displaced and pressurized within said second hydraulic system when said wave forces cause said at least one float assembly to move when in said body of water.

15. The system to harness energy from water waves set forth in claim 14, further characterized in that said central body is made of foam.

16. The system to harness energy from water waves set forth in claim 15, further characterized in that said at least one float assembly further comprises a compact mass internally housed within said central body.

17. The system to harness energy from water waves set forth in claim 16, further characterized in that said at least one float assembly further comprises a frame to secure to said first and second arms.

18. The system to harness energy from water waves set forth in claim 17, further characterized in that said at least one float assembly further comprises a plate connector that extends from said compact mass to said mounting plate, and said at least one float assembly further comprises a pin connector that extends from said frame to said first and second arms.

19. The system to harness energy from water waves set forth in claim 14, further characterized in that said first hydraulic system further comprises a control valve, said moving frame assembly is placed in a raised position to lift said at least one float assembly from said body of water with said first hydraulic system, and said moving frame assembly is placed in a lowered position to lower said at least one float assembly into said body of water with said first hydraulic system.

20. The system to harness energy from water waves set forth in claim 19, further characterized in that said frame assembly comprises a platform having doors to access said moving frame assembly, said platform positioned above said moving frame assembly, said frame assembly comprises a housing assembly fixed upon said platform, said housing assembly houses said hydraulic motor and said generator, said electrical system comprises weather-monitoring equipment, and said frame assembly is anchored to floor of said body of water.

* * * * *